(12) United States Patent
Gong et al.

(10) Patent No.: US 12,485,295 B2
(45) Date of Patent: Dec. 2, 2025

(54) NEUTRON CAPTURE THERAPY SYSTEM

(71) Applicant: NEUBORON THERAPY SYSTEM LTD., Fujian (CN)

(72) Inventors: Qiu-ping Gong, Fujian (CN); Wei-Lin Chen, Fujian (CN)

(73) Assignee: NEUBORON THERAPY SYSTEM LTD., Fujian (CN)

( * ) Notice: Subject to any disclaimer, the term of this patent is extended or adjusted under 35 U.S.C. 154(b) by 599 days.

(21) Appl. No.: 17/899,718

(22) Filed: Aug. 31, 2022

(65) Prior Publication Data
US 2022/0409933 A1 Dec. 29, 2022

Related U.S. Application Data

(63) Continuation of application No. PCT/CN2021/081284, filed on Mar. 17, 2021.

(30) Foreign Application Priority Data

Mar. 18, 2020 (CN) .......................... 202010190673.3

(51) Int. Cl.
*A61N 5/10* (2006.01)
*G21G 4/02* (2006.01)

(52) U.S. Cl.
CPC ............. *A61N 5/1077* (2013.01); *G21G 4/02* (2013.01); *A61N 2005/109* (2013.01); *A61N 2005/1094* (2013.01)

(58) Field of Classification Search
None
See application file for complete search history.

(56) References Cited

U.S. PATENT DOCUMENTS

| 5,722,985 A | 3/1998 | Pettus |
| 2013/0114773 A1 | 5/2013 | Vaucher et al. |
| 2021/0025050 A1 | 1/2021 | Umada et al. |

FOREIGN PATENT DOCUMENTS

| CN | 102119584 A | 7/2011 |
| CN | 107139155 A | 9/2017 |
| CN | 108969907 A | 12/2018 |

(Continued)

OTHER PUBLICATIONS

International Search Report of PCT/CN2021/081284, Jun. 17, 2021.

*Primary Examiner* — Eliza W Osenbaugh-Stewart
(74) *Attorney, Agent, or Firm* — Troutman Pepper Locke LLP; Tim Tingkang Xia, Esq.

(57) ABSTRACT

A neutron capture therapy system, including a vacuum tube for transmitting a charged particle beam, a neutron generating part for generating a neutron beam, and a beam shaping assembly for shaping the neutron beam. The beam shaping assembly is provided with an accommodating part. The neutron generating part is disposed at an end of the vacuum tube. The vacuum tube has a first position and a second position. The neutron capture therapy system further includes a removal device, which includes a moving part that drives the vacuum tube to move. The moving part has a third position and a fourth position. When the moving part is in the third position, the vacuum tube is in the first position. When the moving part is in the fourth position, the vacuum tube is in the second position, and the neutron generating part is located at the outer side of the beam shaping assembly.

10 Claims, 4 Drawing Sheets

(56) References Cited

FOREIGN PATENT DOCUMENTS

| | | |
|---|---|---|
| CN | 208355947 U | 1/2019 |
| CN | 109925610 A | 6/2019 |
| CN | 209253965 U | 8/2019 |
| JP | H02110490 U | 9/1990 |
| JP | H0733587 U | 6/1995 |
| JP | 2004169071 A | 6/2004 |
| JP | 2005014183 A | 1/2005 |
| JP | 2012057247 A | 3/2012 |
| JP | 2013019692 A | 1/2013 |
| JP | 6024864 B2 * | 11/2016 |
| JP | 2019178348 A | 10/2019 |
| WO | 2019114308 A1 | 6/2019 |
| WO | 2019189122 A1 | 10/2019 |

* cited by examiner

NEUTRON CAPTURE THERAPY SYSTEM

CROSS-REFERENCE TO RELATED PATENT APPLICATION

This application is a continuation application of International Application No. PCT/CN2021/081284, filed on Mar. 17, 2021, which claims priority to Chinese Patent Application No. 202010190673.3, filed on Mar. 18, 2020, the disclosures of which are hereby incorporated by reference.

TECHNICAL FIELD

The disclosure relates to a radioactive ray irradiation system, and in particular to a neutron capture therapy system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the disclosure.

With the development of atomics, radio therapy, such as cobalt sixty, a linear accelerator, an electron beam, or the like, has become one of the major means to treat cancers. However, traditional photon or electron therapy is restricted by physical conditions of radioactive rays themselves, and thus will also harm a large number of normal tissues on a beam path while killing tumor cells. Furthermore, owing to different levels of sensitivity of tumor cells to radioactive rays, traditional radiotherapy often has poor treatment effect on radioresistant malignant tumors (for example, glioblastoma multiforme and melanoma) with radio resistance.

In order to reduce radiation injury to normal tissues around tumors, a target therapy concept in chemotherapy is applied to radiotherapy. With respect to tumor cells with high radio resistance, radiation sources with high relative biological effectiveness (RBE), such as proton therapy, heavy particle therapy, neutron capture therapy, or the like, are also developed actively now. Here neutron capture therapy combines the abovementioned two concepts, for example, boron neutron capture therapy. By means of specific aggregation of boron-containing drugs in tumor cells and cooperating with precise neutron beam control, a cancer treatment choice better than traditional radioactive rays is provided.

In a neutron capture therapy system with an accelerator, a charged particle beam is accelerated by the accelerator, and is accelerated to an energy sufficiently to overcome Coulomb repulsion of atomic nucleus of a neutron generating part in a beam shaping assembly, and has a nuclear reaction with the neutron generating part so as to generate neutrons. Therefore, in the process of generating the neutrons, the neutron generating part will be subjected to irradiation of the accelerated charged particle beam with high power, and temperature of the neutron generating part will be increased to a great extent, so that service life of the neutron generating part is affected. Therefore, it is necessary to replace the neutron generating part, however, the neutron generating part irradiated by the accelerated charged particle beam at a high energy level will inevitably have a large number of radiant rays, therefore there will be inevitably radiation safety hazard when the neutron generating part is replaced.

SUMMARY

In order to provide a neutron capture therapy system which reduces radiation safety hazard, an embodiment of the disclosure provides a neutron capture therapy system, including a vacuum tube configured to transmit a charged particle beam, a neutron generating part configured to generate a neutron beam, and a beam shaping assembly configured to shape the neutron beam and provided with an accommodation part, the vacuum tube having a first end and a second end, the neutron generating part arranged at the first end of the vacuum tube, the vacuum tube comprising a first position and a second position, and the neutron capture therapy system further includes a removal device which allows the vacuum tube to move between the first position and the second position, the neutron generating part capable of reacting with the charged particle beam to generate neutrons, in response to the vacuum tube located in the first position, and the neutron generating part located at an outer side of the beam shaping assembly in response to the vacuum tube located in the second position.

Preferably, the removal device may include a moving part which drives the vacuum tube to move and includes a third position and a fourth position, a transverse extension direction of the beam shaping assembly is defined as an X direction, and the moving part moves between the third position and the fourth position along the X direction, the vacuum tube is located in the first position in response to the moving part located in the third position, and the vacuum tube is located in the second position in response to the moving part located in the fourth position.

Further, the removal device may further include at least one clamping part capable of clamping or loosening the vacuum tube controllably, and the clamping part moves along with the moving part in the X direction. In the embodiment, there are four clamping parts, every two clamping parts form a group, and each group has two clamping parts arranged up and down. Of course, there may be any number of clamping parts, provided that the clamping parts are arranged to be capable of clamping or loosening the vacuum tube and clamp the vacuum tube to move along with the moving part controllably. For another example, the clamping part has a structure of a circular hole shape, and the vacuum tube is clamped by expanding or reducing the circular hole of the clamping part.

Further, the removal device may further include a tensioning part supporting the clamping part, the tensioning part movies along with the moving part in the X direction, and the clamping part passes through the tensioning part and rotates relative to the tensioning part so as to clamp or loosen the vacuum tube controllably. Specifically, the tensioning part is provided with a first through hole, the clamping part passes through the first through hole and is supported by a hole wall of the first through hole, and the clamping part rotates in the first through hole to clamp or loosen the vacuum tube controllably.

Further, the removal device may further include an abutment part fixedly connected to the moving part, the abutment part is closer to the vacuum tube compared to the tensioning part in the X direction, the tensioning part includes a fifth position and a sixth position, a connector extends from the tensioning part to the abutment part, the connector passes through the abutment part to allow the tensioning part to move between the fifth position and the sixth position. The vacuum tube may further include a seventh position located between the first position and the second position, the vacuum tube is located in the first position in response to the tensioning part located in the fifth position, and the vacuum tube is located in the seventh position and the abutment part abuts against the second end of the vacuum tube in response to the tensioning part located in the sixth position, and the clamping part passes through the abutment part by passing through the tensioning part, to be located on a surface of the vacuum tube so as to clamp or loosen the vacuum tube controllably. Specifically, the abutment part is provided with a second through hole, and the connector is supported by a hole wall of the second through hole, passes through the second through hole and moves relative to the second through hole, to allow the tensioning part to move between the fifth position and the sixth position. The abutment part is further provided with a third through hole penetrating through the abutment part, and the clamping part passes through the third through hole by passing through the first through hole, to be located on the surface of the vacuum tube. In the embodiment, a size of the third through hole is larger than that of the first through hole, so that a range of the clamping part rotating in the first through hole is not restricted by the third through hole, thereby contributing to clamping or loosening the vacuum tube by the clamping part. The abutment part is arranged to provide the vacuum tube with an abutment force besides a clamping force of the clamping part, so that the vacuum tube is capable of keeping balanced in the process of moving between the first position and the second position, a situation that the vacuum tube is inclined in the moving process to interfere with the accommodation part of the beam shaping assembly is avoided, and thus the vacuum tube is separated and removed more easily from the beam shaping assembly.

Further, each of the moving part, the tensioning part and the abutment part may have a structure of a plate-shape, the moving part includes a first lateral face and a second lateral face arranged opposite to the first lateral face, the abutment part includes a third lateral face and a fourth lateral face arranged opposite to the third lateral face, the tensioning part includes a fifth lateral face and a sixth lateral face arranged opposite to the fifth lateral face, and the third lateral face, the fourth lateral face, the fifth lateral face and the sixth lateral face are parallel to each other; and each of the third lateral face, the fourth lateral face, the fifth lateral face and the sixth lateral face is perpendicular to the first lateral face and the second lateral face. The first through hole penetrates through the sixth lateral face from the fifth lateral face, the second through hole penetrates through the fourth lateral face from the third lateral face, and the third through hole penetrates through the fourth lateral face from the third lateral face.

Further, the removal device may further include an alignment part configured to determine a relative position between the removal device and the vacuum tube, the alignment part is arranged on the abutment part, and the clamping part is closer to an outer surface of the vacuum tube compared to the alignment part for better clamping effect. The alignment part is configured to align the moving part of removal device with the vacuum tube, that is, configured to determine a relative position relationship between the removal device and the vacuum tube. The clamping part of the removal device is located on an outer side of the vacuum tube after positions of the removal device and the vacuum tube are determined according to the alignment part. In the embodiment, there are four alignment parts which are evenly distributed on the periphery of the clamping part. In other embodiments, there may be any number of alignment parts, provided that the alignment parts are arranged not to interfere with actions of the clamping part and arranged to play a role of guiding alignment. For example, the alignment part has a structure of a circular hole shape and is capable of being expanded or reduced, and the whole removal device is guided to be aligned with the vacuum tube by expanding or reducing the circular hole of the alignment part.

Further, the removal part may further include two reinforcement parts which are connected with the first lateral face of the moving part and the fourth lateral face of the abutment part, and the tensioning part is located between the moving part and the two reinforcement parts.

Further, the removal device may further include a shielding part configured to shield the neutron generating part, the clamping part and the moving part are located in the shielding part and move in the shielding part, and the neutron generating part is accommodated in the shielding part in response to the vacuum tube located in the second position. As a specific embodiment, the shielding part may include a bottom wall where the moving part is arranged, a top wall arranged opposite to the bottom wall and a side wall connecting the bottom wall and the top wall. The top wall, the bottom wall and the side wall are connected to form a shielding space. The clamping part and the moving part are located in the shielding space and move in the shielding space all the time. The neutron generating part is accommodated in the shielding space when the vacuum tube is located in the second position.

Further, the side wall may include a first side wall capable of opening or closing the shielding part, the vacuum tube is capable of moving from the first position to the second position in response to the first side wall opening the shielding part, and the vacuum tube is located in the second position in response to the first side wall closing the shielding part.

Another embodiment of the disclosure provides a neutron capture therapy system or include a neutron capture therapy system, including a vacuum tube configured to transmit a charged particle beam, a neutron generating part configured to generate a neutron beam, and a beam shaping assembly configured to shape the neutron beam and provided with an accommodation part, the neutron generating part arranged at one end of the vacuum tube which has a first position and a second position, the neutron generating part capable of reacting with the charged particle beam to generate neutrons, in response to the vacuum tube located in the first position, and the neutron generating part located at an outer side of the beam shaping assembly in response to the vacuum tube located in the second position, the neutron capture therapy system further includes a removal device which includes a moving part, the moving part drives the vacuum tube to move between the first position and the second position.

Further, the removal device may further include a clamping part configured to clamp the vacuum tube, to allow the vacuum tube to move between the first position and the second position.

Further, the removal device may further include a shielding part configured to shield the neutron generating part, and the moving part is located in the shielding part and capable of moving in the shielding part all the time.

The disclosure further provides a method for replacing target of the neutron capture therapy system, including the following operations. The vacuum tube is aligned with the removal device to determine a relative position between the vacuum tube and the removal device in response to the vacuum tube located in the first position. The vacuum tube is clamped by the clamping part of the removal device, to allow the vacuum tube to move between the first position and the second position along an X direction.

Further, the removal device may further include a shielding part configured to shield the neutron generating part, and the vacuum tube may further include a seventh position located between the first position and the second position, and the method for replacing target may include the following operations. The vacuum tube is partially accommodated in the shielding part when the vacuum tube moves from the first position to the seventh position along an X direction. The vacuum tube is completely accommodated in the shielding part when the vacuum tube moves continuously from the seventh position to the second position along the X direction.

In the disclosure, the seventh position is located between the first position and the second position, therefore movement of the vacuum tube between the first position and the second position in the disclosure includes movement of the vacuum tube from the first position to the seventh position and movement of the vacuum tube from the seventh position to the second position. Furthermore, by trying to keep the vacuum tube being located in the accommodation part and the shielding space most time in the process of replacing target, it may be clearly known that each displacement distance of the vacuum tube in the process of moving from the first position to the second position is equal to a distance of the vacuum tube moving from the beam shaping assembly to the shielding space.

The neutron capture therapy system provided by the disclosure reduces degree of participation of workers in the process of replacing target, by arranging the removal device, so that contact between workers and radiant rays is reduced and the radiation safety hazard is reduced.

Further areas of applicability will become apparent from the description provided herein. It should be understood that the description and specific examples are intended for purposes of illustration only and are not intended to limit the scope of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE DISCLOSURE

Figure 1:
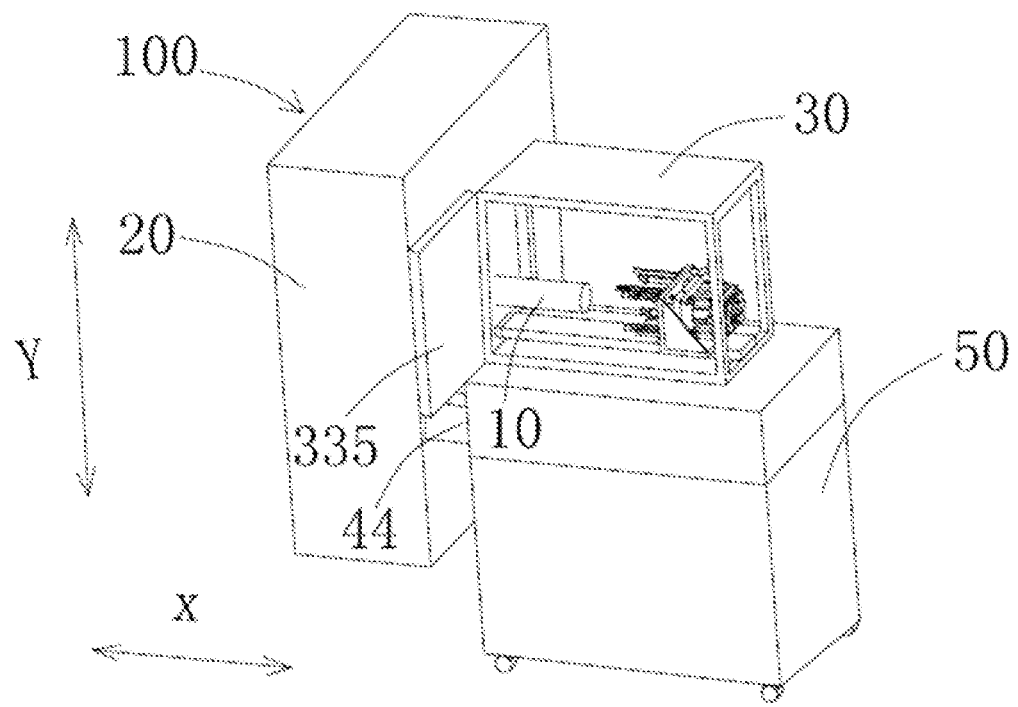
FIG. 1 is a stereogram of a neutron capture therapy system of the disclosure, here a neutron generating part is located at a first position.

Neutron capture therapy has been applied increasingly as an effective cancer treatment means in recent years. Boron neutron capture therapy is the most common one. Neutrons for the boron neutron capture therapy may be supplied by nuclear reactors or accelerators. In the embodiment of the disclosure, by taking boron neutron capture therapy with an accelerator as an example, basic components for the boron neutron capture therapy with an accelerator usually include an accelerator configured to accelerate charged particles (such as protons and deuterons), a neutron generating part, a heat removal system and a beam shaping assembly. The accelerated charged particles act with a metal-made neutron generating part to generate neutrons, and a proper nuclear reaction is selected according to characteristics such as required neutron yield rate and energy, available energy and magnitudes of currents of accelerated charged particles, physical and chemical properties of the metal-made neutron generating part, or the like. Nuclear reactions $^7Li(p,n)^7Be$ and $^9Be(p,n)^9B$ are often discussed, both of which are endothermic reactions with energy thresholds of 1.881 MeV and 2.055 MeV respectively. An ideal neutron source for the boron neutron capture therapy is epithermal neutrons at a keV energy level, therefore when protons with energy slightly higher than a threshold are theoretically used to bombard a lithium-made neutron generating part, neutrons with relatively low energy may be generated and may be clinically used without too much retarding treatment. However, sections of lithium (Li)-made and beryllium (Be)-made neutron generating parts acting with protons with threshold energy are not large. In order to generate a large enough neutron flux, protons with higher energy are usually used to trigger nuclear reactions.

An ideal neutron generating part has characteristics that the neutron yield rate is high, energy distribution of generated neutrons is approximate to ergoregion of epithermal neutrons (it will be described in detail below), too much intensive penetrating radiation is not generated, the neutron generating part is safe and cheap, easy to operate, high-temperature resistant, or the like. However, it is actually unable to find nuclear reactions meeting all requirements. In the embodiment of the disclosure, the lithium-made neutron generating part is used. However those skilled in the art know that materials of the neutron generating part may further be made from other metal materials besides the abovementioned metal materials.

Requirements on the heat removal system are different due to a selected nuclear reaction. For example, requirements of $^7Li(p, n)^7Be$ on the heat removal system are higher than those of $^9Be(p,n)^9B$ since the melting point and the thermal conductivity coefficient of the metal-made neutron generating part (lithium) are low. In the embodiment of the disclosure, the nuclear reaction of $^7Li(p,n)^7Be$ is used. It may be known that the temperature of the neutron generating part subjected to radiation of the accelerated charged particle beam at a high energy level will inevitably increase greatly, thereby, affecting the service life of the neutron generating part.

Therefore the neutron capture therapy system inevitably has a problem of replacing the neutron generating part. In order to reduce contact between workers and radiant rays as much as possible, the disclosure provides a neutron capture therapy system.

Main radiation of persons replacing target is originated from radiant rays generated by a nuclear reaction occurred after the charged particle beam radiates the neutron generating part, therefore the disclosure is intended to illustrate detachment of the neutron generating part after the nuclear reaction occurs, rather than illustrating installation of a new neutron generating part.

Figure 2:
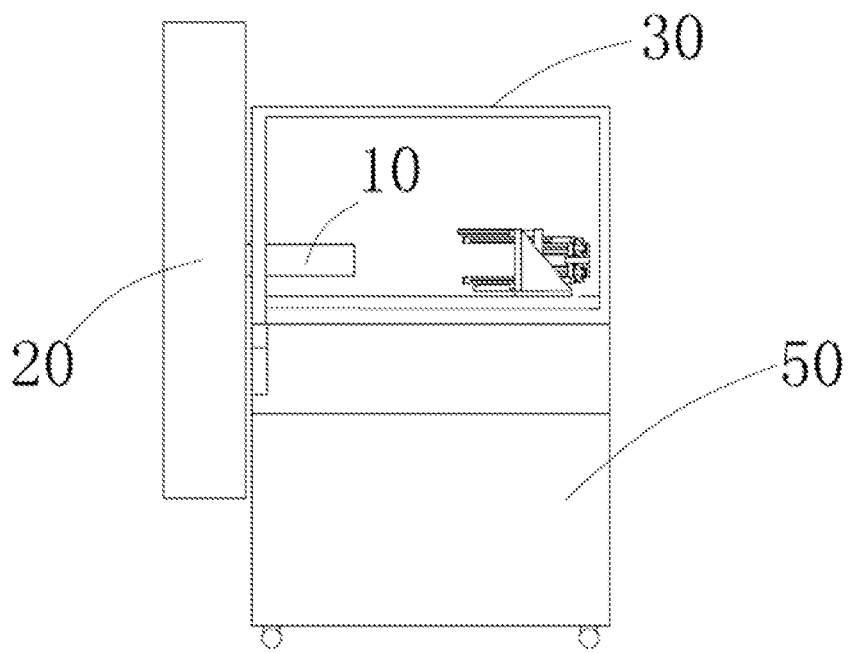
FIG. 2 is a schematic diagram of the neutron capture therapy system shown in FIG. 1 from another perspective.

As shown in FIGS. 1 and 2, a neutron capture therapy system 100 includes a vacuum tube 10 configured to transmit a charged particle beam P, a neutron generating part T (see FIGS. 3, 7 and 8) arranged on an end of the vacuum tube 10 to generate a neutron beam N, a beam shaping assembly 20 configured to shape the neutron beam N, and a removal device 30 configured to detach the vacuum tube 10.

Figure 3:
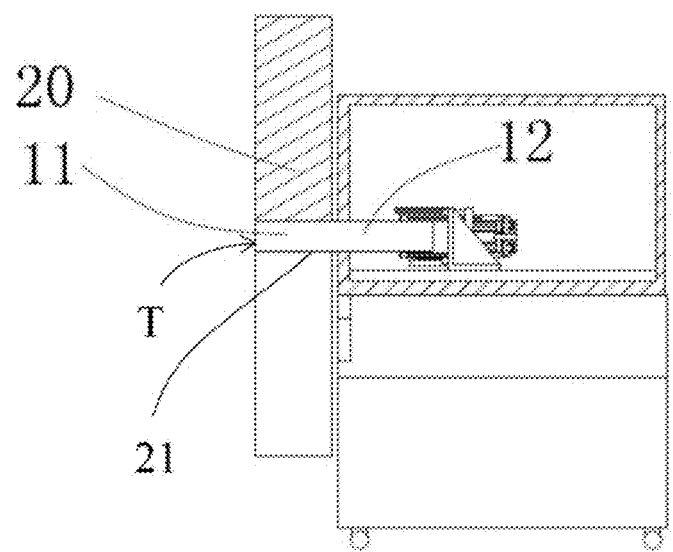
FIG. 3 is a schematic diagram of a moving part located at a third position in FIG. 2, here a beam shaping assembly is shown in a form of partial section.
Figure 4:
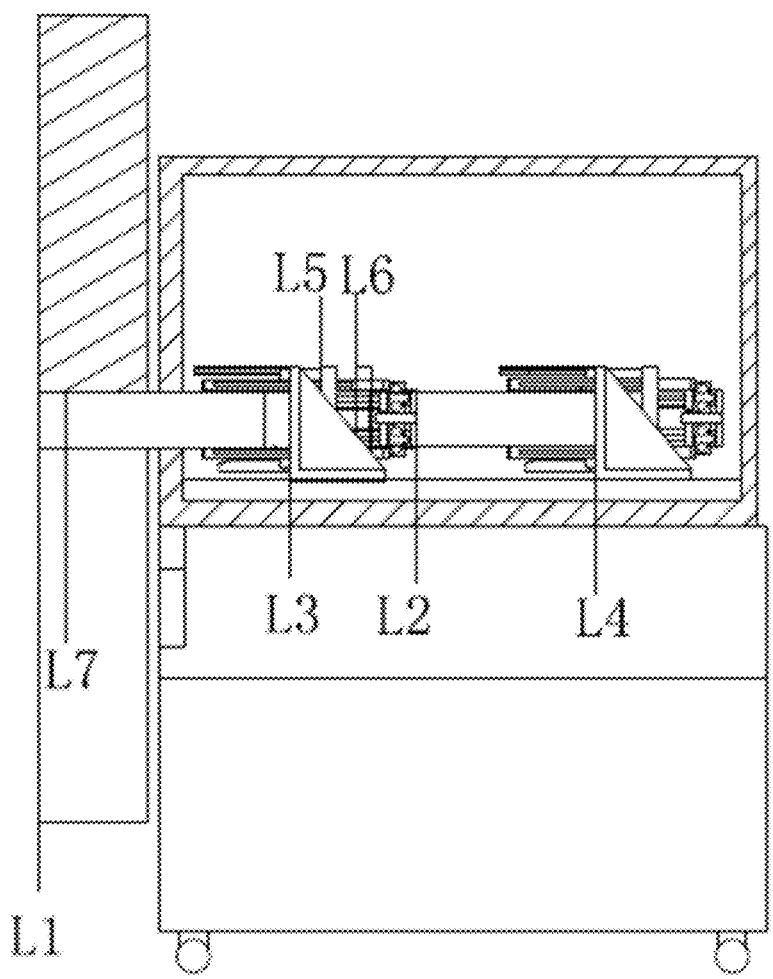
FIG. 4 is a schematic diagram of replacing target for a removal device, including schematic diagrams where a moving part moves from a third position to a fourth position, a tensioning part moves from a fifth position to a sixth position, and a vacuum tube moves from a first position to a seventh position and a second position.
Figure 5:
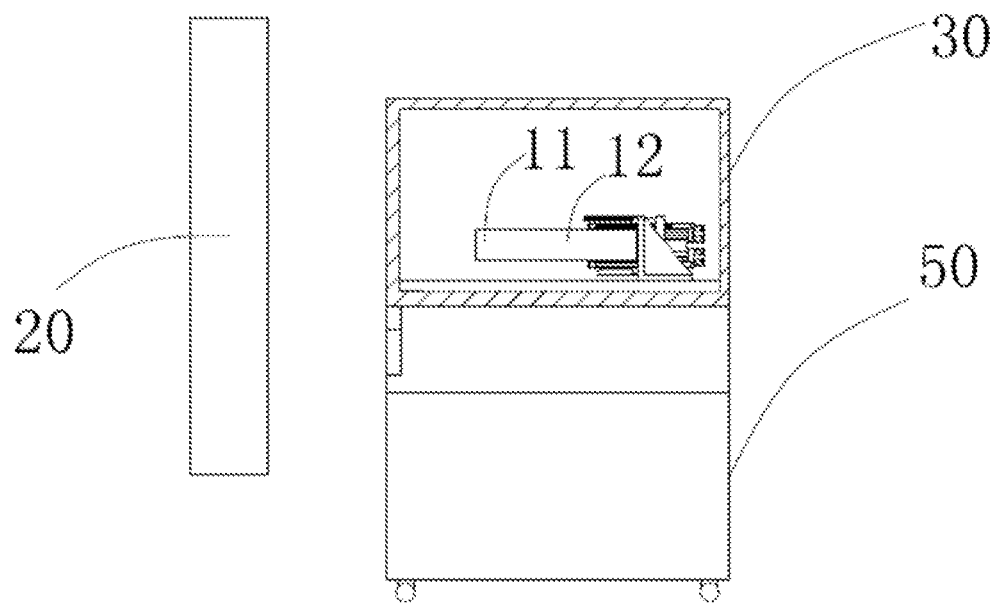
FIG. 5 is a schematic diagram of a removal device be taken away from a beam shaping assembly after target is replaced.

In combination of FIGS. 3 to 5, the beam shaping assembly 20 is provided with an accommodation part 21. In the embodiment, the vacuum tube 10 includes a burying part 11 buried in the accommodation part 21 and an extension part 12 extending out of the accommodation part 21 to be located outside the beam shaping assembly 20. An end of the burying part 11 is a first end (not labeled), and an end of the extension part 12 is a second end (not labeled). The neutron generating part T is arranged on the first end and moves along with the vacuum tube 10 together. The vacuum tube 10 includes a first position L1 and a second position L2, and the removal device 30 allows the vacuum tube 10 to move between the first position L1 and the second position L2. When the vacuum tube 10 is located in the first position L1, the neutron generating part T is capable of reacting with the charged particle beam P to generate neutrons, and when the vacuum tube 10 is located in the second position L2, the neutron generating part T is located on an outer side of the accommodation part 21 of the beam shaping assembly 20.

Figure 6:
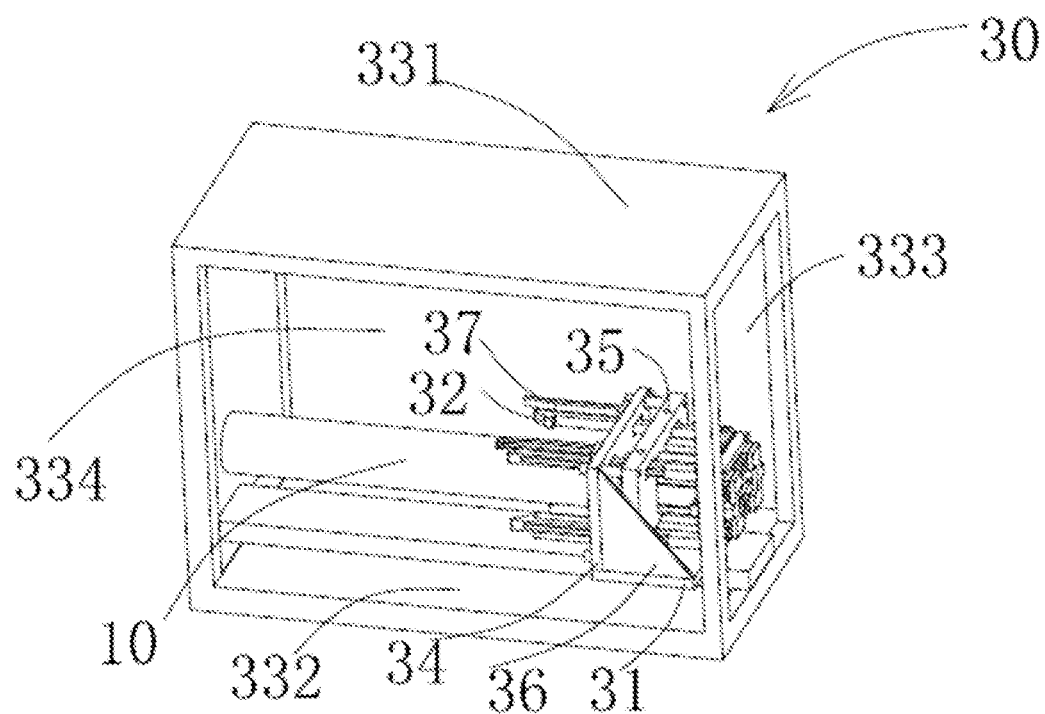
FIG. 6 is a schematic diagram of a removal device of the disclosure.
Figure 7:
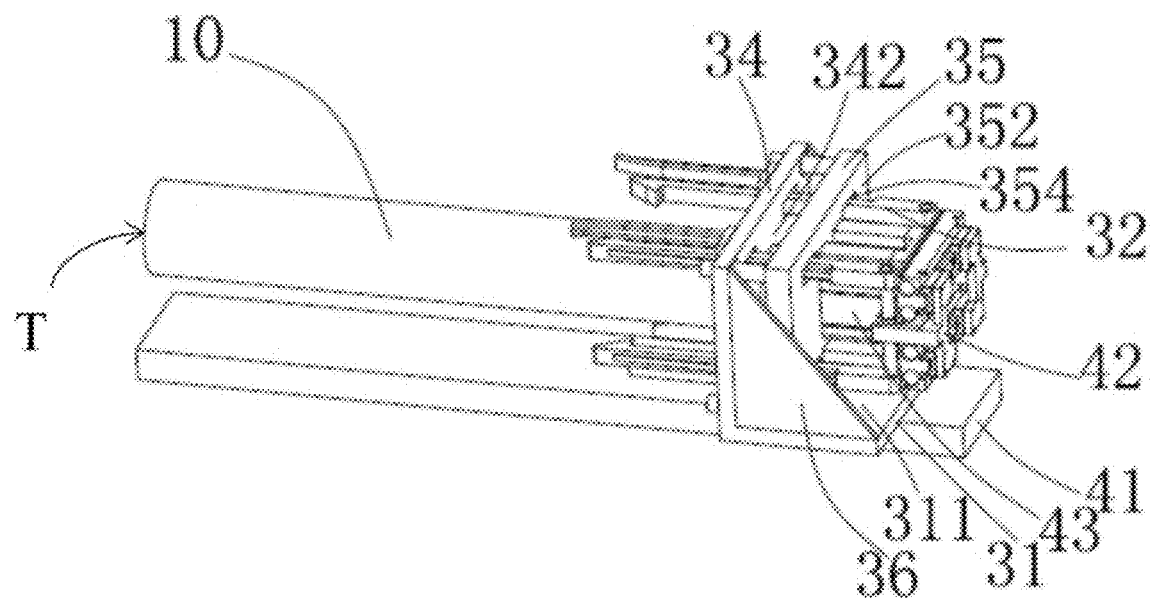
FIG. 7 is a schematic diagram of a removal device excluding a shielding part.
Figure 8:
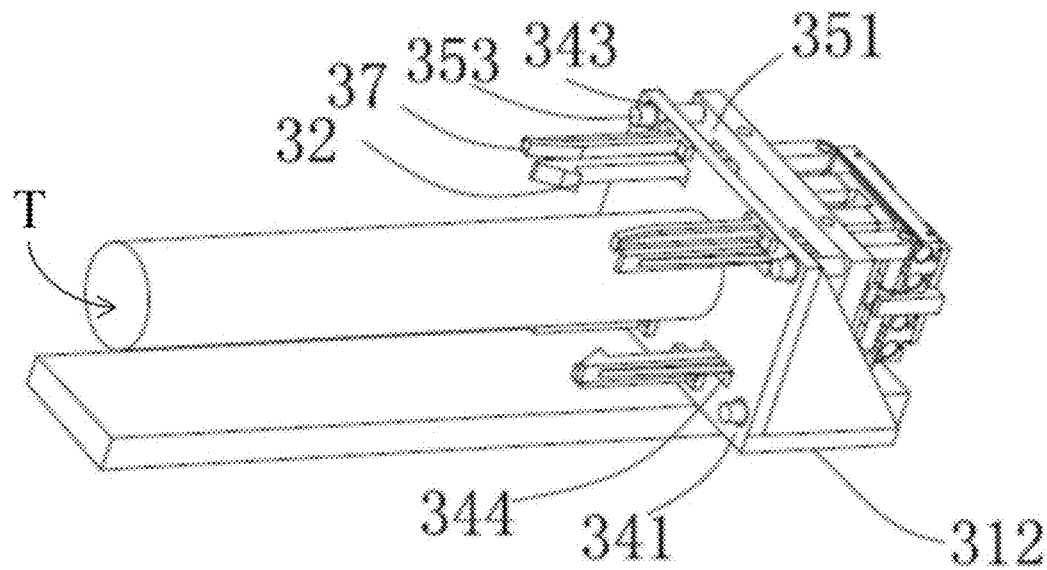
FIG. 8 is a schematic diagram of the removal device shown in FIG. 7 from another perspective.

Referring to FIGS. 6 to 8, the removal device 30 includes a moving part 31 configured to drive the vacuum tube 10 to move between the first position L1 and the second position L2, a clamping part 32 configured to clamp the vacuum tube 10 and move along with the moving part 31, and a shielding part (not labeled) configured to shield the vacuum tube 10 provided with the neutron generating part T.

In combination with FIG. 4, a transverse extension direction of the beam shaping assembly 20 is defined as an X direction, the moving part 31 includes a third position L3 and a fourth position L4 and moves between the third position L3 and the fourth position L4 along the X direction. When the moving part 31 is located in the third position L3, the vacuum tube 10 is located in the first position L1, and at the moment, the neutron generating part T is capable of reacting with the charged particle beam to generate neutrons, and when the moving part 31 is located in the fourth position L4, the vacuum tube 10 is located in the second position L2, and at the moment, the neutron generating part T is located on the outer side of the beam shaping assembly 20 and is accommodated in the shielding part (not labeled).

In combination with FIG. 6, in the embodiment of the disclosure, there are four clamping parts 32, every two clamping parts 32 form a group, and each group has two clamping parts arranged up and down. When the moving part 31 is located in the third position L3, the clamping part 32 is located on an outer surface of the vacuum tube 10 and clamps or loosens the outer surface of the vacuum tube 10 controllably as needed. In other embodiments, the vacuum tube may further be provided with a flange or a groove thereon, and the clamping part is clamped in the flange or groove of the vacuum tube. Of course, there may be any number of clamping parts 32, provided that the clamping parts 32 are arranged to be capable of clamping or loosening the vacuum tube 10 and allowing the vacuum tube 10 to move along with the moving part 31 together. For example, there are two clamping parts. In order to provide the vacuum tube with an enough clamping force, an angle between the two clamping parts is set to 180 degrees. Similarly, when there are three clamping parts, in order to provide the vacuum tube with an enough clamping force, the three clamping parts are evenly distributed in a circumferential direction of the vacuum tube. For another example, the clamping part has a structure of a circular hole shape and is capable of being expanded or reduced, and the vacuum tube is loosened or clamped by expanding or reducing the circular hole of the clamping part controllably. Specifically, the clamping part includes a first clamping part, a second clamping part and a lock catch part, here the second clamping part has one end connected with the first clamping part and the other end separated from the first clamping part, the lock catch part is configured to connect or loosen the first clamping part and the second clamping part controllably, the first clamping part and the second clamping part are integrally formed, so that it may be considered that there is one clamping part. As one embodiment, the ends, separated from each other, of the first clamping part and the second clamping part are provided with threaded holes, respectively, and the lock catch part includes a screw and a nut matched with the screw. The screw passes through the threaded hole of the first clamping part and the threaded hole of the second clamping part. The nut on the screw is screwed, so that the first clamping part and the second clamping part are separated or connected. When the first clamping part and the second clamping part are connected together, the whole clamping part has a circular hole shape. A degree of tightening the nut decides a pore size of the circular hole, so that the clamping part clamps or loosens the vacuum tube controllably. The lock catch part may further be of other mechanical structures, provided that the first clamping part and the second clamping part clamp or loosen the vacuum tube controllably. Furthermore, each of the first clamping part and the second clamping part may further have a structure with two ends separated. By arranging two lock catch parts, the clamping part clamps or loosens the vacuum tube controllably. In this case, it may further be considered that there are two clamping parts.

In combination with FIGS. 7 and 8, the removal device 30 further includes an abutment part 34 fixedly connected with the moving part 31 and moving along with the moving part 31, and a tensioning part 35 capable of moving relative to the abutment part 34. The abutment part 34 is closer to the neutron generating part T compared to the tensioning part 35 in the X direction. The tensioning part 35 moves along with the moving part 31 in the X direction, and the clamping part 32 passes through the tensioning part 35 and rotates relative to the tensioning part 35, so as to clamp or loosen the outer surface of the vacuum tube 10 controllably. In the disclosure, each of the moving part 31, the abutment part 34 and the tensioning part 35 has a structure of a plate shape. The moving part 31 includes a first lateral face 311 and a second lateral face 312 arranged opposite to the first lateral face 311. The abutment part 34 includes a third lateral face 341 and a fourth lateral face 342 arranged opposite to the third lateral face 341. The tensioning part 35 includes a fifth lateral face 351 and a sixth lateral face 352 arranged opposite to the fifth lateral face 351. The third lateral face 341, the fourth lateral face 342, the fifth lateral face 351 and the sixth lateral face 352 are parallel to each other, and each of the third lateral face 341, the fourth lateral face 342, the fifth lateral face 351 and the sixth lateral face 352 are perpendicular to the first lateral face 311 and the second lateral face 312.

A connector 353 extends from the fifth lateral face 351 of the tensioning part 35 to the fourth lateral face 342 of the abutment part 34. At least two first through holes 354 with rectangular cross sections penetrate from the fifth lateral face 351 to the sixth lateral face 352 of the tensioning part 35. A second through hole 343 penetrates from the third lateral face 341 to the fourth lateral face 342 of the abutment part 34. The connector 353 is supported on a hole wall of the second through hole 343 and is capable of moving in the second through hole 343 relative to the abutment part 34 along the X direction. The tensioning part 35 moves along with the connector 353. A third through hole 344 corresponding to the first through hole 354 penetrates from the third lateral face 341 to the fourth lateral face 342 of the abutment part 34 and also has a rectangular cross section, and the clamping part 32 passes through the first through hole 354 and enters the third through hole 344. The clamping part 32 is supported by a hole wall of the first through hole 354 and is capable of rotating in the first through hole 354 and the third through hole 344 since it is supported by the first through hole 354, thereby clamping or loosening the outer surface of the vacuum tube 10 controllably. In the disclosure, in order not to restrict a range of the clamping part 32 rotating in the first through hole 354 by the third through hole 344, a size of the third through hole 344 is larger than that of the first through hole 354 in the rotating direction. The clamping part 32 and the tensioning part 35 are relatively fixed in the X direction, that is, the clamping part 32 and the tensioning part 35 move together in the X direction. The tensioning part 35 has a fifth position L5 and a sixth position L6. The vacuum tube 10 further includes a seventh position L7 located between the first position L1 and the second position L2. The tensioning part 35 moves between the fifth position L5 and the sixth position L6 relative to the abutment part 34, along with movement of the connector 353 in the second through hole 343. When the tensioning part 35 is located in the fifth position L5, the vacuum tube 10 is located in the first position L1, and when the tensioning part 35 is located in the sixth position L6, the vacuum tube 10 is located in the seventh position L7, and at the moment, the abutment part 34 abuts against an end of the extension part 12 of the vacuum tube 10. Such arrangement has advantages that before the moving part 31 drives the vacuum tube 10 to move to the second position L2, the tensioning part 35 moves from the fifth position L5 to the sixth position L6 so as to drive the clamping part 32 clamping the vacuum tube 10 to move, and the end of the extension part 12 of the vacuum tube 10 abuts against the abutment part 34, that is, the vacuum tube 10 moves to the seventh position L7. Therefore, when the vacuum tube 10 is moved, the abutment part 34 further provides the vacuum tube 10 with an abutment force besides a clamping force provided by the clamping part 32 to the vacuum tube 10, so that the vacuum tube 10 is capable of keeping balanced in the moving process, a situation that the vacuum tube 10 is inclined in the moving process to interfere with the accommodation part 21 is avoided, and thus the vacuum tube 10 is removed more easily from the accommodation part 21. Of course, in other embodiments, the vacuum tube 10 may be completely buried in the accommodation part 21 without providing with the extension part. In this case, the clamping part 32 directly extends into the accommodation part 21 to clamp the vacuum tube 10, or the clamping part is arranged so that the clamping part is capable of clamping a second end of the vacuum tube, and thus the vacuum tube 10 moves between the first position L1 and the second position L2, along with movement of the moving part 31 between the third position L3 and the fourth position L4. In the embodiment, a filling part (not labeled) being used for shielding is further arranged between an inner wall of the accommodation part 21 and an outer wall of the vacuum tube 10. When the clamping part clamps the vacuum tube to allow the vacuum tube to move together with the moving part from the first position L1 to the second position L2, the filling part moves together with the vacuum tube.

The shielding part (not labeled) includes a top wall 331, a bottom wall 332 arranged opposite to the top wall 331, and a side wall 333 connecting the top wall 331 and the bottom wall 332. A shielding space 334 accommodating the moving part 31, the tensioning part 35 and the abutment part 34 is formed among the top wall 331, the bottom wall 332 and the side wall 333. The moving part 31 is arranged on the bottom wall 332, and each of the moving part 31, the clamping part 32, the tensioning part 35 and the abutment part 34 moves in the shielding space 334 all the time. The side wall 333 includes a first side wall 335 capable of being opened or closed. When the first side wall 335 is opened, the vacuum tube 10 is capable of moving from the first position L1 to the second position L2, and when the vacuum tube 10 is located in the second position L2, the first side wall 335 is closed and the vacuum tube 10 is shielded. A distance of the vacuum tube 10 moving from the first position L1 to the second position L2 is equal to a distance of the vacuum tube 10 moving from the beam shaping space 20 to the shielding space 334.

In the embodiment of the disclosure, the removal device 30 further includes two reinforcement parts 36 located in the shielding space 334, the reinforcement parts 36 are connected with the first lateral face 311 of the moving part 31 and the fourth lateral face 342 of the abutment part 34, and the tensioning part 35 is located between the moving part 31 and the two reinforcement parts 36. The reinforcement parts 36 are arranged to enhance overall strength of the removal device 30. At least two alignment parts 37 are configured to determine a relative position between the removal device 30 and the vacuum tube 10 are further fixedly clamped on the third lateral face 341 of the abutment part 34, so that the clamping part 32 is located on the outer surface of the vacuum tube 10. In the embodiment, there are four alignment parts 37, every two alignment parts 37 form a group, and each group of alignment parts 37 is located on an outer side of each group of clamping parts 32. Here each group of alignment parts 37 located on the outer side of each group of clamping parts 32 may be construed in such a manner that when the moving part 31 is located in the third position L3, the clamping part 32 is closer to an outer surface of the vacuum tube 10 compared to the alignment part 37 for better clamping effect. Before target of the removal device 30 is replaced, a relative position between the removal device 30 and the vacuum tube 10 is determined according to the alignment part 37.

The removal device 30 further includes a driving part (not labeled). The driving part includes a first driving part 41 configured to drive the moving part 31 to move between the third position L3 and the fourth position L4, a second driving part 42 configured to drive the clamping part 32 to clamp or loosen the outer surface of the vacuum tube 10 controllably, a third driving part 43 configured to drive the tensioning part 35 to move between the fifth position L5 and the sixth position L6, and a fourth driving part 44 configured to drive the first side wall 335 to open or close the shielding part (not labeled).

In the disclosure, each of the first driving part 41 and the fourth driving part 44 is a rodless cylinder. The first lateral face 311 of the moving part 31 is arranged on the first driving part 41, and the moving part 31 moves between the third position L3 and the fourth position L4 under action of the first driving part 41. The first side wall 335 is arranged on the fourth driving part 44, and the first side wall 335 is opened or closed under action of the fourth driving part. In the embodiment of the disclosure, the second driving part 42 is a thin air claw type cylinder. The third driving part 43 is a telescopic cylinder. The telescopic cylinder has one end connected with the fourth lateral face 342 of the abutment part 34 and the other end fixedly connected with the fifth lateral face 351 of the tensioning part 35. Under action of the third driving part 43, the tensioning part 35 moves between the fifth position L5 and the sixth position L6 relative to the abutment part 34.

The neutron capture therapy system 100 further includes a supporting part 50 capable of moving, the removal device 30 is arranged on the supporting part 50, and the fourth driving part 44 is arranged on a lateral face, close to the beam shaping assembly 20, of the supporting part 50. The supporting part 50 is adjusted according to the alignment part 37, so that the clamping part 32 is located on an outer surface of the extension part 12 of the vacuum tube 10, thereby determining the relative position between the removal device 30 and the vacuum tube. A direction perpendicular to the X direction is defined as a Y direction. In the disclosure, the supporting part 50 is further capable of extending or shortening along the Y direction.

Operations of replacing target of the removal device 30 are described below.

In operation S1, the supporting part 50 is adjusted through the alignment part 37 to align the moving part 32 of the removal device 30 with the vacuum tube 10 and determine the relative position between the removal device 30 and the vacuum tube 10.

In operation S2, the moving part 31 is driven by the first driving part 41 to move to the third position L3, and at the moment, the extension part 12 of the vacuum tube 10 enters the shielding space 334 of the shielding part, the vacuum tube is located in the first position L1, the fourth driving part 44 drives the first side wall 335 to open the shielding part, the clamping part 32 is located in the vacuum tube 10 and is arranged in a loosened state controllably, and the tensioning part 35 is located in the fifth position L5.

In operation S3, the clamping part 32 is driven by the second driving part 42 to clamp the outer surface of the vacuum tube 10.

In operation S4, the tensioning part 35 is driven by the third driving part 43 to move from the fifth position L5 to the sixth position L6, and at the moment, the vacuum tube 10 moves from the first position L1 to the seventh position L7.

In operation S5, the moving part 31 is driven by the first driving part 41 to move from the third position L3 to the fourth position L4, and at the moment, the vacuum tube moves from the seventh position L7 to the second position L2, and the vacuum tube 10 is completely accommodated in the shielding space 334.

In operation S6, the first side wall 335 is driven by the fourth driving part 44 to close the shielding part.

In operation S7, the supporting part 50 is moved, so that the removal device 30 accommodating the vacuum tube 10 is away from the beam shaping assembly 20.

The neutron capture therapy system disclosed by the disclosure is not limited to contents described in the above-mentioned embodiments and structures represented by accompanying drawings. Apparent changes, substitutions or modifications made on materials, shapes and positions of components therein based on the disclosure shall fall within the protection scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and might be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A neutron capture therapy system, comprising:
    a vacuum tube configured to allow a charged particle beam to transmit therethrough, the vacuum tube having a first end and a second end and comprising a first position and a second position,
    a neutron generating part configured to generate a neutron beam and arranged at the first end of the vacuum tube, and
    an assembly provided with an accommodation part, and
    a removal device comprising a moving part, at least one clamping part capable of clamping or loosening the vacuum tube, and a tensioning part supporting the clamping part,
    wherein the removal device allows the vacuum tube to move between the first position and the second position, the neutron generating part is capable of reacting with the charged particle beam to generate neutrons, in response to the vacuum tube being located in the first position, and the neutron generating part is located at an outer side of the accommodation part of the assembly in response to the vacuum tube being located in the second position,
    wherein the moving part drives the vacuum tube to move and comprises a third position and a fourth position, a transverse extension direction of the assembly is defined as an X direction, the moving part moves between the third position and the fourth position along the X direction, the clamping part and the tensioning part move along with the moving part in the X direction, the vacuum tube is located in the first position in response to the moving part being located in the third position, the vacuum tube is located in the second position in response to the moving part being located in the fourth position, and the clamping part passes through the tensioning part and rotates relative to the tensioning part so as to clamp or loosen the vacuum tube.

2. The neutron capture therapy system of claim 1, wherein the removal device further comprises an abutment part fixedly connected to the moving part, the abutment part is closer to the vacuum tube compared to the tensioning part in the X direction, the tensioning part comprises a fifth position and a sixth position, a connector extends from the tensioning part to the abutment part, the connector passes through the abutment part to allow the tensioning part to move between the fifth position and the sixth position, the vacuum tube further comprises a seventh position located between the first position and the second position, the vacuum tube is located in the first position in response to the tensioning part located in the fifth position, and the vacuum tube is located in the seventh position and the abutment part abuts against the second end of the vacuum tube, in response to the tensioning part located in the sixth position, and the clamping part passes through the abutment part by passing through the tensioning part so as to clamp or loosen the vacuum tube.

3. The neutron capture therapy system of claim 2, wherein each of the moving part, the tensioning part and the abutment part has a structure of a plate shape, the moving part comprises a first lateral face and a second lateral face arranged opposite to the first lateral face, the abutment part comprises a third lateral face and a fourth lateral face arranged opposite to the third lateral face, the tensioning part comprises a fifth lateral face and a sixth lateral face arranged opposite to the fifth lateral face, and the third lateral face, the fourth lateral face, the fifth lateral face and the sixth lateral face are parallel to each other; and each of the third lateral face, the fourth lateral face, the fifth lateral face and the sixth lateral face are perpendicular to the first lateral face and the second lateral face.

4. The neutron capture therapy system of claim 3, wherein the removal part further comprises two reinforcement parts which are connected with the first lateral face of the moving part and the fourth lateral face of the abutment part, and the tensioning part is located between the moving part and the two reinforcement parts.

5. The neutron capture therapy system of claim 1, wherein the removal device further comprises a shielding part configured to shield the neutron generating part, the clamping part and the moving part are located in the shielding part and move in the shielding part, and the neutron generating part is accommodated in the shielding part in response to the vacuum tube located in the second position.

6. The neutron capture therapy system of claim 5, wherein the shielding part comprises a first side wall capable of opening or closing the shielding part, the vacuum tube is capable of moving from the first position to the second position in response to the first side wall opening the shielding part, and the vacuum tube is located in the second position in response to the first side wall closing the shielding part.

7. A method for replacing a target of the neutron capture therapy system of claim 1, the method comprising:
 moving the vacuum tube from the first position to the second position by the removal device.

8. The method of claim 7, further comprising:
 driving the vacuum tube by the moving part such that the vacuum tube is separated from the assembly, and moving the vacuum tube along with the moving part together from the first position to the second position.

9. The method of claim 8, further comprising:
 controlling the at least one clamping part to clamp the vacuum tube such that the vacuum tube moves along with the moving part via the clamping part.

10. The method of claim 8, wherein the removal device comprises a shielding part configured to shield the neutron generating part, and the method further comprises:
 situating the moving part inside the shielding part, and allowing the moving part to move inside the shielding part.

* * * * *